Oct. 15, 1968  B. P. DE DUBE, JR  3,406,322
SEEKING SWITCH REMOTE MOTOR CONTROL WHEREIN EACH POSITION IS
UNIQUELY ENCODED BY 2N CONDUCTORS AND 2N NON-CONDUCTORS
Filed Dec. 30, 1964  3 Sheets-Sheet 1

INVENTOR.
Bret P. de Dube Jr.

INVENTOR
Bret P. de Dube Jr.

Oct. 15, 1968

B. P. DE DUBE. JR 3,406,322

SEEKING SWITCH REMOTE MOTOR CONTROL WHEREIN EACH POSITION IS
UNIQUELY ENCODED BY 2N CONDUCTORS AND 2N NON-CONDUCTORS

Filed Dec. 30, 1964

INVENTOR.

Brut P. de Dube Jr.

United States Patent Office 3,406,322
Patented Oct. 15, 1968

3,406,322
SEEKING SWITCH REMOTE MOTOR CONTROL
WHEREIN EACH POSITION IS UNIQUELY
ENCODED BY 2N CONDUCTORS AND 2N
NON-CONDUCTORS
Bret P. de Dube, Jr., 6 Club Drive,
Massapequa, N.Y. 11758
Filed Dec. 30, 1964, Ser. No. 422,329
6 Claims. (Cl. 318—33)

ABSTRACT OF THE DISCLOSURE

Remote position control consists of command switch that is interconnected through electrical conductors to remotely located, motor driven, follow-up switch.

Operation is based on a principle whereby all interconnected switch positions are electrically energized except for one position that is selected.

Command switch will remotely de-energize selected position through a unique electrical code and forces motor driven follow-up switch to rotate until the electrically de-energized position is reached cutting electrical power to the driving motor.

This invention relates in general to remote position control and more particularly to a switch and circuit arrangement whereby a manually operable selector switch can be used to control the angular position of a remotely located follow-up switch.

There are a wide variety of situations where it is desired to control a switch arrangement that has a large number of pre-determined angular positions from some remote location. The known switching arrangements to perform this function generally consist of a plurality of rotors and multiple wiper contacts which are subject to complex synchronization. Where it is desired to control to a large number of separate angular positions, one of the major disadvantages of the previously known systems is that they require a very large number of interconnecting wires between the manually controlled selector switch and the follow-up switch whose position it is ultimately desired to affect.

Accordingly, it is a major purpose of this invention to provide a means whereby the angular position of a switch can be remotely controlled to a large number of pre-determined angular positions with a minimum ratio of the number of interconnecting wires to the number of pre-determined angular positions available.

A major reason for wishing to minimize the number of interconnecting wires is that when control has to be exercised from any substantial distance, the cost and weight of these wires becomes a major proportion of the entire cost of the system. The reduction in the number of wires will greatly decrease the over-all cost of the system and will also serve to reduce maintenance problems.

Another problem with the previously known remote control systems is that a plurality of rotors must be employed in which there are many wiper contacts that must be synchronized. The large number of switching elements involved at each location not only increases cost but, equally importantly, reduces reliability.

It is therefore another major purpose of this invention to provide a substantially simpler switch than had previously been known for achieving a large number of pre-determined angular positions.

It is a related purpose of this invention to obtain a maximum number of pre-determined angular positions with a minimum number of electrical rotor wiper contacts in both the command and the follow-up switches so as to extend the operational life and reliability of the system.

In brief, the switching arrangement of this invention involves the employment of a multi-channel code on both the command switch and on the follow-up switch. An eight channel code will be described herein. Each channel on the switch is constituted by a ring coded in conducting and non-conducting segments. The eight rings are concentric with one another so that they may be laid out on a single flat surface. A wiper arm carryng eight individual wiper contacts is mounted so that each wiper contact is in electrical contact with a separate one of the channels. When the wiper arm on the command switch is rotated to the desired angular position, the individual wiper contacts of the command switch wiper arm will be placed either on a conducting bit or a non-conducting bit in each channel. For an eight channel switching arrangement, the general rule covering the deployment of bits is that, at each position, four of the wiper arm contacts will be on non-conducting bits while four of the wiper arm contacts will be on conducting bits.

A similar wiper arm exists on a similarly coded follow-up switch. The only difference between the coding on the follow-up switch and on the command switch is that every conducting bit on the command switch is matched by a non-conducting bit on the follow-up switch while every non-conducting bit on the command switch is matched by a conducting bit on the follow-up switch. A single interconnecting wire is connected from each channel in the command switch to the corresponding channel in the follow-up switch. Thus with eight channels, there are eight wires interconnecting the channels. In addition, there is a common lead which is electrically connected to the wiper arms of each of the two switches as well as to a motor and a source of power so that a series circuit is established between the wiper arm of the command switch, a source of power, a motor and the wiper arm of the follow-up switch. The wiper arm of the follow-up switch is mechanically connected to the motor so that as long as the motor is on, the wiper arm of the follow-up switch will rotate. As long as any one pair of corresponding contacts on the command switch wiper arm and wollow-up switch wiper arm are both in contact with a conducting bit, then a circuit will be completed through the motor. The key to comprehending how this invention works is to keep in mind that the coding on the follow-up switch is a mirror image (in terms of conducting and insulating bits) of the coding on the command switch. Since the coding at each angular position is unique and at each position the coding employs four conducting bits and four non-conducting bits, there is only one position on the follow-up switch (for a given position on the command switch) where no pair of corresponding wiper arm contacts will both be in contact with a conducting bit. That unique position is, of course, the code on the follow-up switch that is the "mirror image" of the code on the command switch.

Thus, if the wiper arm on the command switch is placed at any given desired position, there will be at least one channel through the wiper arm contacts that will be closed and the motor will rotate the wiper arm of the follow-up switch. The wiper arm of the follow-up switch will continue to rotate until it comes to a position where: (1) the four wiper arm contacts on the follow-up switch that are in contact with conducting bits will be matched by corresponding four wiper arm contacts on the command switch which are in contact with non-conducting bits and (2) the four wiper arm contacts on the follow-up switch which are in contact with non-conducting bits will be matched by four wiper arm contacts on the command switch which are in contact with conducting bits. Accordingly, at that position there will be no completed circuit possible through any one of the eight interconnecting wires between the eight channels and the flow of current will stop. At that point, the motor will stop and the follow-up switch will have been rotated to the desired position.

Other objects and purposes of this invention will become apparent from the following detailed description and drawings in which.

Figure 1:
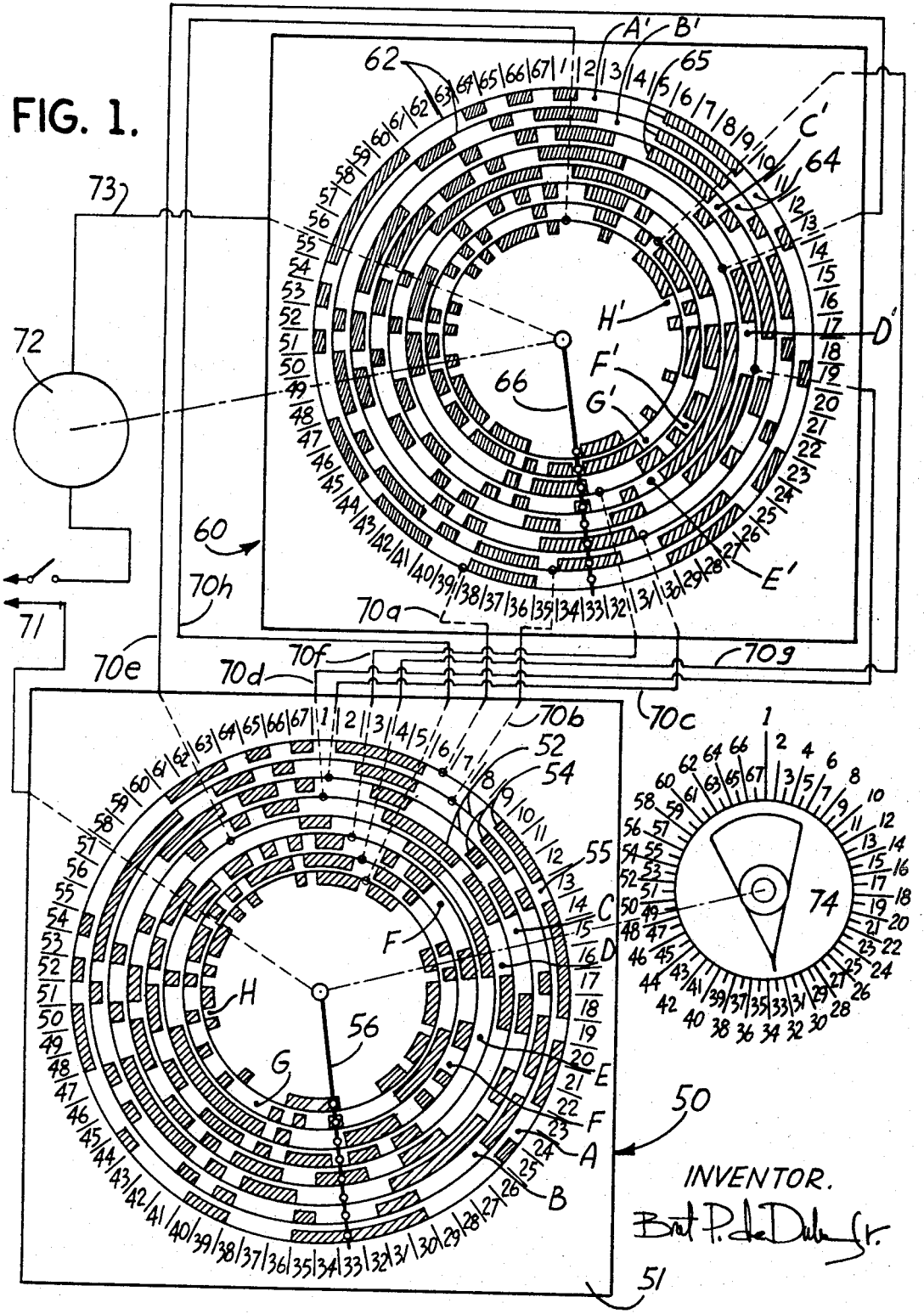
FIG. 1 is an electrical schematic diagram showing the connections between the command switch and the follow-up switch.
Figure 2:
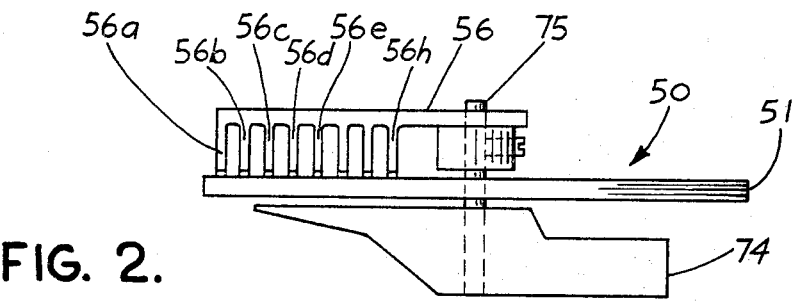
FIG. 2 is a side elevation of the command switch.
Figure 3:
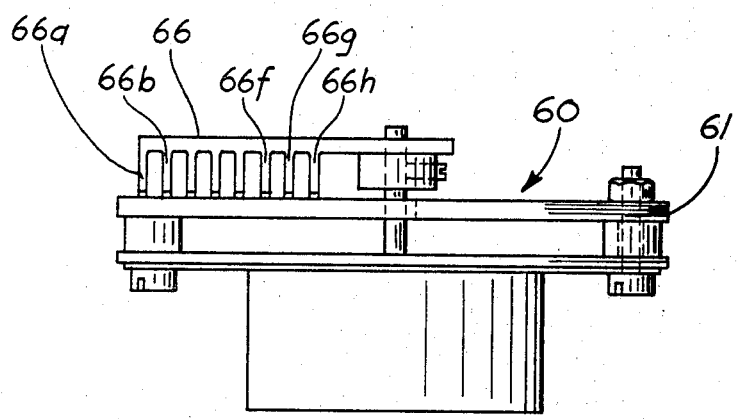
FIG. 3 is a side elevation view of the follow-up switch and associated drive motor.

The system of this invention is illustrated in FIG. 1 while certain of the details are clarified in FIGS. 2 and 3. The invention will be described in connection with an eight channel code, coded to indicate sixty-seven switch positions. The system of this invention and the coding technique are particularly adapted to the employment of a printed circuit technique for laying out each switch. For that reason, the invention is shown in connection with a printed circuit arrangement.

The command switch 50 is an insulating wafer 51 on which conducting bits 54 and conducting rings 52 have been printed. Between conducting bits 54 there are insulating bits 55 (which are simply areas of the wafer 51 which have not been printed with conducting material). Eight channels A through H are involved and the basic printing arrangement for each channel is similar. Thus the outer channel A includes a 360° thin ring 52a of conducting material and a series of conducting bits 54a deployed as shown. Each conducting bit 54a is in conducting contact with the ring 52a. The second channel B is printed in exactly the same fashion having a 360° conducting ring 52b to which each of the conducting bits 54b are electrically connected. The conducting portions of the second channel B are electrically insulated from the conducting portions of the first channel A. In similar fashion, each channel A-H is electrically insulated on the wafer 51 from all other channels.

The follow-up switch is identical in structure to the command switch 50 except that each conducting bit 54 on the command switch 50 is matched by an insulating bit 64 on the follow-up switch 60 and each non-conducting bit 55 on the command switch 50 is matched by a conducting bit 65 on the follow-up switch 60. For example, the six position conducting bit 54 in channel A that runs from position 30 through position 35, is matched by a six position insulating bit 64 in channel A' on the follow-up switch 60.

Interconnecting wire 70a connects the conducting portions of the A channel on switch 50 to the conducting portions of the A' channel on switch 60. Corresponding wires 70b through 70h perform the same function for the other seven channels B through H.

An electrically conducting wiper arm 56 is spaced above the printed surface of the switch 50 and has eight wiper contacts, one reaching down to make electrical contact with each of the eight channels A-H. This arrangement may better be seen in FIG. 2 where the wiper arm 56 is shown having wiper contacts 56a through 56h, each wiper contact making electrical contact with a respective one of the channels A through H. A manually operable selector switch 74 is mounted on the same shaft 75 as carries the wiper arm 56 so that an operator can readily manually position the arm 56.

As may best be seen in FIG. 3, the follow-up switch 60 has a similarly constructed wiper arm 66 that is a conducting wiper arm and that makes electrical contact with each of the channels through separate wiper arm contacts 66a through 66h. As is shown in FIG. 1, the wiper arm 66 is electrically connected, in series, with a source of power 71 and a motor 72 to the wiper arm 56. The motor 72, shaft 76 is extended and the wiper arm 66 is mounted thereon so that the arm 66 will rotate as long as power is supplied to the motor 72.

Through the selector switch 74, the operator is enabled to move the wiper arm 56 to any desired one of the sixty seven positions shown on the embodiment illustrated. Assuming that the position 33, as illustrated in FIG. 1, is selected, then contacts 56a, 56d, 56g and 56h will be in contact with conducting bits in their respective channels while the other four wiper arm contacts will be in contact with insulating bits. Accordingly, a circuit will be completed from the motor 72, the source of power 71, the wiper arm 56, and four parallel circuits to four of the conducting rings on the follow-up switch 60. These four parallel circuits include, respectively: (1) the contact 56a, the conducting bit 54 in channel A at position 33, the conducting ring 52a, the interconnecting wire 70a and the conducting ring 62a; (2) the contact 56d, the conducting bit 54 in channel D at position 33, the conducting ring 52d, the interconnecting wire 70d and the conducting ring 62d. Comparable parallel circuits through channels G and H will also be made at position 33. In order to complete a circuit through the wiper arm 66 and the lead 73 back to the motor 72 so that a completed circuit can be established and power fed to the motor 72, it is necessary only that at least one of the contacts 66a, 66d, 66g or 66h be in contact with a conducting bit in its respective channel on the follow-up switch 60. Since there are four parallel circuits through the corresponding contacts at the command switch 50, only one of these four circuits need be completed in order to complete the over-all circuit to supply power to the motor 72. The code on the switches 50 and 60 is such that at least one of these four contacts on the wiper arm 66 will be in contact with a conducting bit at all positions of the wiper arm 66 other than the position 33. Thus the motor 72 will be turned "on" to rotate the wiper arm 66 until the wiper arm 66 reaches position 33. At position 33, and only at position 33, all four of these wiper arm 66 contacts (66a, 66d, 66g and 66h) will be on an insulating bit so that no circuit is completed and the motor 72 comes to a stop.

In this fashion the positioning of the wiper arm 56 at any given desired position will cause the motor 72 to turn the wiper arm 66 until the arm 66 rests on a position corresponding to the position of arm 56.

Each position of the command switch is uniquely coded in eight channels so that at each position four of the channels have a conducting bit and four of the channels have an insulating bit. That unique code is matched on the follow-up switch 60 only at the corresponding position. However, it is matched in the sense that each conducting bit 54 on the command switch 50 has a corresponding insulating bit 64 on the follow-up switch 60 and each insulating bit 55 on the command switch 50 has a corresponding conducting bit 65 on the follow-up switch 60. Since the code at each position differs from the code at any other position and since the code at each position always involves four conducting bits and four non-conducting bits, it follows that the only position of the follow-up switch 60 wiper arm 66 that will cause a break in the electrical circuit to the motor 72 is the one position that corresponds to the position selected for the wiper arm 56 at the command switch 50.

Figure 4:
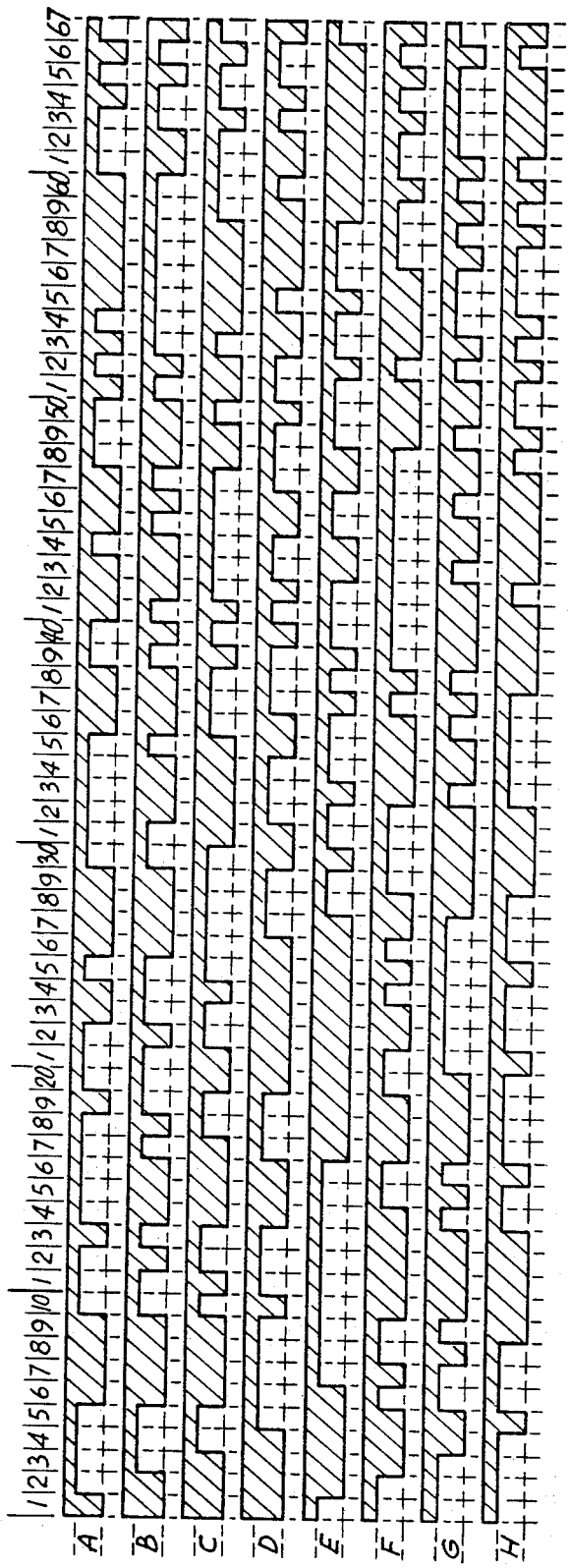
FIG. 4 is a rectangular display of the code which is employed in circular form on the face of the command switch.

FIG. 4 illustrates the eight channel code that is employed in the embodiment illustrated. The nature of the code is such that because each position is uniquely coded, the coding of the positions may be interchanged in any desired fashion. For example, the coding at position 35 and position 12 could be interchanged and the device would work exactly as described. What is necessary is that each position is uniquely coded and that it is coded with four conducting and four non-conducting bits. It is further necessary that the coding on the follow-up switch 60 be identical with the coding on the command switch 50, except that conducting bits on the switch 50 be paired with non-conducting bits on the switch 60.

Although one particular embodiment of this invention has been described in detail, it would be obvious that many variations may be made without departing from the scope of this invention.

Figure 6:
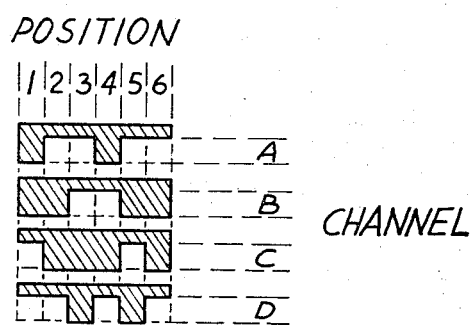
FIG. 6 is a rectangular display of the 4 channel code that controls 6 switch positions.
Figure 5:
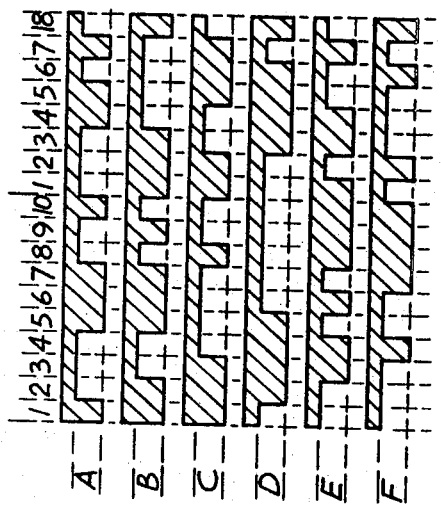
FIG. 5 is a rectangular display of the 6 channel code that controls 18 switch positions.

For example, the number of channels employed will depend entirely upon the number of positions which it is desired to have. For control of up to 6 switching positions see 4 channel code FIG. 6 and for control of up to 18 switching positions see 6 channel code FIG. 5. The most efficient use of the code calls for an even number of channels so that at each position an equal number of conducting and non-conducting bits may be employed. However, an odd number of channels could be employed.

The channels on the follow-up and command switch are shown such that the corresponding channels are in corresponding structural position on the two switches; that is channel A on the command switch corresponds to channel A' on the follow-up switch and there is an interconnecting line 70a connecting the conducting bits of these two corresponding channels. It shall be understood herein that in the specification and claims, reference to corresponding channels shall be to correspondingly coded channels which are electrically interconnected and which may or may not have any specific spatial relationship to one another. For example, if the second concentric circle (labeled B' in FIG. 1) were encoded as is channel A' and the conducting bits in the second concentric circle were connected to the line 70a, then it would be the second channel in the follow-up switch which corresponds to the outer channel in the command switch. Thus the channels can be arranged in a spatially similar fashion or spatially dissimilar fashion as long as they are properly interconnected by the line 70a.

The embodiment disclosed is a preferred embodiment and a simple design. It is preferred because it is simple to have the separate positions of the wiper arm in the follow-up switch be angular sectors of a circular area. However, with the proper camming or other mechanical arrangements, there is no reason why one or the other or both of the wiper arms could not be made to traverse a more complex path. It would even be possible for the base area of each switch on which the coding is arranged to be rectangularly laid out. All that would be necessary in such a rectangular layout is some additional feature for automatically returning the wiper arm on the follow-up switch to the first sector after it has moved past the last sector. The wiper arm would then search for the appropriate matching section as it passed, say, from left to right and if it did not find the desired section then would be returned by some readily designable automatic feature to its starting position to sweep through a complete scan from zero position to the last position.

One of the major advantages of the coding technique described, and illustrated in FIG. 4, over a standard binary code is the assurance that the circuit will always remain closed until the follow-up switch arm is at the matching position. One of the disadvantages of using a standard binary code is that for certain command switch positions there will be multiple follow-up switch positions which would break the circuit and thus there could not be an assurance of adequate control. As the worst example, if the switches were coded in a standard binary code and the command switch were placed at the position "1" then the follow-up switch would break the circuit at about half the rest of the positions on the switch, specifically at positions such as "3," "5," "7," etc. Accordingly, the construction of an appropriate code is essential for the operation of this invention.

The command switch 50, which is illustrated in FIG. 1, could be replaced by a bank of either eight relays or eight diodes or other electronic, electrical or mechanical devices whose state (that is whether open or closed, conducting or non-conducting as the case may be) is determined by a computer output or a key board or some device which will encode the bank of eight bi-stable units in accordance with the code illustrated in FIG. 4. These bi-stable units (relays, diodes, transistors, etc.) are then connected to the rest of the circuitry as shown in FIG. 1. One side of each bi-stable unit being connected by means of a separate wire to separate channels on the follow-up switch 60 and the other side of each unit being connected to a common lead which completes the circuit by going to a source of power 71. Thus, by use of the code of FIG. 4, a number of mechanizations are possible to obtain the multiposition control provided by this invention through a minimum number of leads from the command position to the follow-up or controlled position.

Accordingly, it shall be understood that the following claims are directed to the full scope of the invention.

What is claimed is:

1. A remote control switching arrangement comprising of said command switch having 4 bi-stable units, each one of said units having an open state and a conducting state, means to control the state of each of said units to encode said units in a fashion corresponding to the encoding of the section of said follow-up switch at which it is desired to position said wiper arm of said follow-up switch, a first side of each of said units being connected to common lead, said follow-up switch having a base area divided into 6 sections, each one of said sections being uniquely encoded by a 4 bit code consisting of conducting and non-conducting bits from each of 4 encoding channels within said base area, there being 2 conducting bits and 2 non-conducting bits in said 4 bit code for each one of said sections, said follow-up switch having a wiper arm with 4 wiper contacts, a separate one of said contacts being in electrical contact with a separate one of said channels, a motor mechanically connected to move said wiper arm on said follow-up switch along a path that keeps said wiper contacts in contact with their respective channels, said motor, and said wiper arm being electrically connected in series with a source of power and said common lead to said first side of each of said bi-stable units, and 4 interconnecting lines between said switches, a separate one of said lines connecting the second side of a separate one of each of said 4 bi-stable units of said command switch to the conducting bits of a corresponding separate one of said 4 channels on said follow-up switch.

2. A remote control switching arrangement comprising of said command switch having 8 bi-stable units, each one of said units having an open state and a conducting state, means to control the state of each of said units to encode said units in a fashion corresponding to the encoding of the section of said follow-up switch at which it is desired to position said wiper arm of said follow-up switch, a first side of each of said units being connected to common lead, said follow-up switch having a base area divided into 67 sections, each one of said sections being uniquely encoded by an 8 bit code consisting of conducting and non-conducting bits for each of 8 encoding channels within said base area, there being 4 conducting bits and 4 non-conducting bits in said 8 bit code for each one said sections, said follow-up switch having a wiper arm with 8 wiper contacts, a separate one of said contacts being in electrical contact with a separate one of said channels, a motor mechanically connected to move said wiper arm on said follow-up switch along a path that keeps said wiper contacts in contact with their respective channels, said motor, and said wiper arm being electrically connected in series with a source of power and said common lead to said first side of each of said bi-stable units, and 8 interconnecting lines between said switches, a separate one of said lines connecting the second side of a separate one of each of said 8 bi-stable units of said command switch to the conducting bits of corresponding separate one of said 8 channels on said followup switch.

3. A remote control switching arrangement comprising of a command switch having a base area divided into a plurality of sectors, each one of said sectors being uniquely encoded by a 2N bit code consisting of a bit from each one of 2N concentric circular coding channels within said base area, there being N conducting bits and N non-conducting bits in said 2N bit code, and a follow-up switch having a base area divided into a plurality of sectors, each one of said sectors being uniquely encoded by a 2N bit code consisting of a bit from each one of 2N concentric circular coding channels within said base area, there being N conducting and N non-conducting bits in said 2N bit code, each of said switches having a wiper arm with 2N wiper contacts, a separate one of said 2N contacts being in electrical contact with a seperate one of said 2N channels, a motor mechanically connected to rotate the one of said wiper arms that is on said follow-up switch in an arc that keeps said wiper contacts in contact with their respective channels, said wiper arms and said motor being electrically connected in series with a source of power, corresponding sectors on said command switch and said follow-up switch being encoded similarly except that conducting bits on one of said switches are matched by corresponding non-conducting bits in corresponding channels on the other one of said switches, and 2N interconnecting lines, a separate one of said lines connecting the conducting bits of a separate channel on said command switch to the conducting bits of corresponding separate channel on said follow-up switch, whereby the presence of said wiper arms on other than corresponding sectors of said switches will result in completing a circuit through at least one of said interconnecting lines thereby energizing said motor and rotating said wiper arm on said follow-up switch until said wiper arm on said follow-up switch attains a position where its 2N wiper contacts are in a sector which is similarly encoded to the sector on which the wiper arm of said command switch is located, wherein "N" is the number 2 or any other larger number less than 80.

4. A remote control switching arrangement comprising of said command switch having 2N bi-stable units, each one of said units having an open state and conducting state, means to control the state of each of said units to encode said units in a fashion corresponding to the encoding of the section of said follow-up switch at which it is desired to position said wiper arm of said follow-up switch, a first side of each of said units being connected to common lead, said follow-up switch a base area divided into a plurality of sections, each one of said sections being uniquely encoded by a 2N bit code consisting of a bit from each one of 2N encoding channels within said base area, there being N conducting bits and N non-conducting bits in said 2N bit code for each one of said sections, said follow-up switch having a wiper arm with 2N wiper contacts, a separate one of said contacts being in electrical contact with a separate one of said channels, a motor mechanically connected to move said wiper arm on said follow-up switch along a path that keeps said wiper contacts in contact with their respective channels, said motor, and said wiper arm being electrically connected in series with a source of power and said common lead to said first side of each of said bi-stable units, and 2N interconnecting lines between said switches, a separate one of said lines connecting the said second side of a separate one of each of said 2N bi-stable units of said command switch to the conducting bits of a corresponding separate one of said channels on said follow-up switch, wherein "N" is the number 2 or any other larger number less than 80.

5. A remote control switching arrangement as specified in claim 3 in which a tape is provided in lieu of circular switch with said bit code comprising of perforated area and unperforated area, said areas performing the of said conducting and non-conducting bits in said follow-up switch and said command switch.

6. A remote control switching arrangement comprising of said command switch having 6 bi-stable units, each one of said units having an open state and a conducting state, means to control the state of each of said units to encode said units in a fashion corresponding to the encoding of the section of said follow-up switch at which it is desired to position said wiper arm of said follow-up switch, a first side of each of said units being connected to common lead, said follow-up switch having a base area divided into 18 sections, each one of said sections being uniquely encoded by an 6 bit code consisting of conducting and non-conducting bits for each of 6 encoding channels within said base area, there being 3 conducting bits and 3 non-conducting bits in said 6 bit code for each one of said sections, said follow-up switch having a wiper arm with 6 wiper contacts, a separate one of said contacts being in electrical contact with a separate one of said channels, a motor mechanically connected to move said wiper arm on said follow-up switch along a path that keeps said wiper contacts in contact with their respective channels, said motor, and said wiper arm being electrically connected in series with a source of power and said common lead to said first side of each of said bistable units, and 6 interconnecting lines between said switches, a separate one of said lines connecting the second side of a separate one of each of said 6 bi-stable units of said command switch to the conducting bits of corresponding separate one of said 6 channels on said follow-up switch.

References Cited

UNITED STATES PATENTS

| | | | |
|---|---|---|---|
| 2,792,545 | 5/1957 | Kamm | 318—20.315 |
| 3,017,557 | 1/1962 | Amato | 318—20.315 |

ORIS L. RADER, *Primary Examiner.*

THOMAS E. LYNCH, *Assistant Examiner.*